United States Patent
Lee et al.

(10) Patent No.: US 8,155,057 B2
(45) Date of Patent: Apr. 10, 2012

(54) WIRELESS LOCAL NETWORK RECONNECTING SYSTEM AND METHOD

(75) Inventors: Ta-Yung Lee, Hsinchu (TW); Chih-Wen Cheng, Hsinchu (TW); Cheng-Hsien Yang, Hsinchu (TW); Chia-Chuan Wu, Hsinchu (TW)

(73) Assignee: Mitac Technology Corp., Hsinchu (TW)

( * ) Notice: Subject to any disclaimer, the term of this patent is extended or adjusted under 35 U.S.C. 154(b) by 665 days.

(21) Appl. No.: 12/358,676

(22) Filed: Jan. 23, 2009

(65) Prior Publication Data
US 2010/0189083 A1 Jul. 29, 2010

(51) Int. Cl.
*H04W 4/00* (2009.01)
(52) U.S. Cl. ........................................................ 370/328
(58) Field of Classification Search .................. None
See application file for complete search history.

(56) References Cited

U.S. PATENT DOCUMENTS

| 7,848,262 | B2 * | 12/2010 | El-Damhougy | 370/255 |
| 2005/0030904 | A1 * | 2/2005 | Oom Temudo de Castro et al. | 370/252 |
| 2008/0002569 | A1 * | 1/2008 | Cole et al. | 370/216 |
| 2008/0309556 | A1 * | 12/2008 | Hohl | 342/451 |
| 2009/0100495 | A1 * | 4/2009 | Manapragada et al. | 725/138 |

* cited by examiner

*Primary Examiner* — Raj Jain

(57) ABSTRACT

A wireless local network reconnecting system and method is provided. The method detects a connection-lost signal generated when a network node of the wireless local network group lost connection. A reconnecting coordinate is calculated according to the connection-lost signal and transmitted to the connection-lost network node through an external communication network. Afterwards, the method guides the connection-lost network node to move to the reconnecting coordinate and reconnect with the wireless local network group wirelessly. Since the external communication network is used to connect with the connection-lost network node, the connection-lost network node is able to reconnect with the wireless local network group through the proposed method.

20 Claims, 3 Drawing Sheets

WIRELESS LOCAL NETWORK RECONNECTING SYSTEM AND METHOD

BACKGROUND OF THE INVENTION

1. Field of the Invention

The present invention relates to a system and method of reconnecting a local network, and more particularly to a wireless local network reconnecting system and method.

2. Related Art

Accompanying with the development of wireless transmission technology, two computers connecting with and sending data to each other through wireless technologies (such as Wi-Fi, Bluetooth and Infrared) has become very common. Besides, through the wireless transmission, two or more computers may be connected as an Ad-hoc wireless local network group.

However, the wireless transmission distance is easily affected by the external environment. Take the IEEE 802.11n standard as an example; the theoretical maximum transmission distance is 400 meter. If a cement wall or other barriers blocks between two computers, the transmission distance will be dramatically decreased.

Therefore, within an Ad-hoc wireless local network group connected by wireless transmission, it is easy for the members of the Ad-hoc wireless local network group to lost connection with the Ad-hoc wireless local network group due to the movement of the members to some locations by accident. The relative movements between the members of the Ad-hoc wireless local network group may also cause some members to lose their connections.

Moreover, when the connection-lost condition occurs, the connection-lost members will need to move back to the transmission range of the Ad-hoc wireless local network group randomly by chance to reconnect and rejoin the Ad-hoc wireless local network group. Only enough luck can bring the connection-lost members back in the Ad-hoc wireless local network group.

Therefore, the members of the conventional ad-hoc wireless local network group have the problem of losing connection easily.

SUMMARY OF THE INVENTION

To solve the aforesaid problems of the prior art, the present invention provides a wireless local network reconnecting method is provided. The method detects a connection-lost signal generated when a network node of the wireless local network group lost connection. A reconnecting coordinate is calculated according to the connection-lost signal and transmitted to the connection-lost network node through an external communication network. Afterwards, the method guides the connection-lost network node to move to the reconnecting coordinate and reconnect with the wireless local network group wireless. Since the external communication network is used to connect with the connection-lost network node, the connection-lost network node is able to reconnect with the wireless local network group through the proposed method.

Therefore, the present invention aims at connecting the connection-lost network node and sending a reconnecting coordinate through the external communication network, thereby facilitating a reconnection between the connection-lost network node and the wireless local network group.

The present invention also provides a wireless local network reconnecting system, which includes a detection module, a calculation module, an external communication module and a guiding module. The detection module detects the connection-lost signal generated when the wireless local network group loses connection with the connection-lost network node. The calculation module calculates the reconnecting coordinate according to the connection-lost signal. The external communication module sends the reconnecting coordinate through the external communication network to the network node. The guiding module guides the connection-lost network node to move to the reconnecting coordinate and reconnect wirelessly with the wireless local network group.

As a brief of the foregoing, the present invention solves the connection-lost problem of the member within the Ad-hoc wireless local network group in the prior art.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1A:
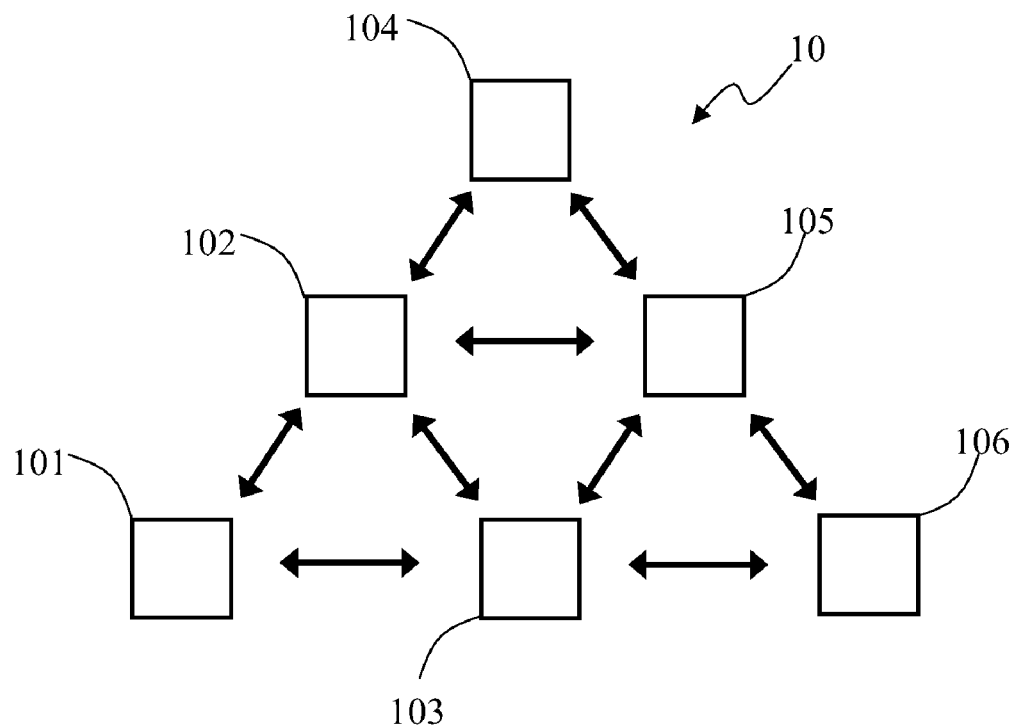
FIG. 1A and FIG. 1B are a schematic diagrams illustrating the connection-lost network node loses connection with the wireless local network group.

Reference will now be made in detail to the present preferred embodiments of the invention, examples of which are illustrated in the accompanying drawings. Wherever possible, the same reference numbers are used in the drawings and the description refers to the same or the like parts.

Each of the embodiments below is applied to a wireless local network group equipped with the wireless transmission mode; wherein the wireless transmission mode of the wireless local network group is compatible with any of Wi-Fi, Bluetooth or Infrared. The network nodes of the present invention may be selected from the group consisting of mobile phone, notebook computer, Personal Digital Assistant (PDA), desktop computer and any combination of the foregoing. The constructed wireless local network group may be an Ad-hoc wireless local network group. Furthermore, the geographic location information within each of the embodiments is compatible with a positing system selected from a group consisting of GPS (Global Positing System), AGPS (Assisted Global Positioning System), GPCS (Global Positing & Communication System), DGPS (Differential Global Positing System), CDGPS (Canadian Differential Global Positing System), Galileo Positioning System, GLONASS (Global Navigation Satellite System) and any combination of the foregoing.

Figure 1B:
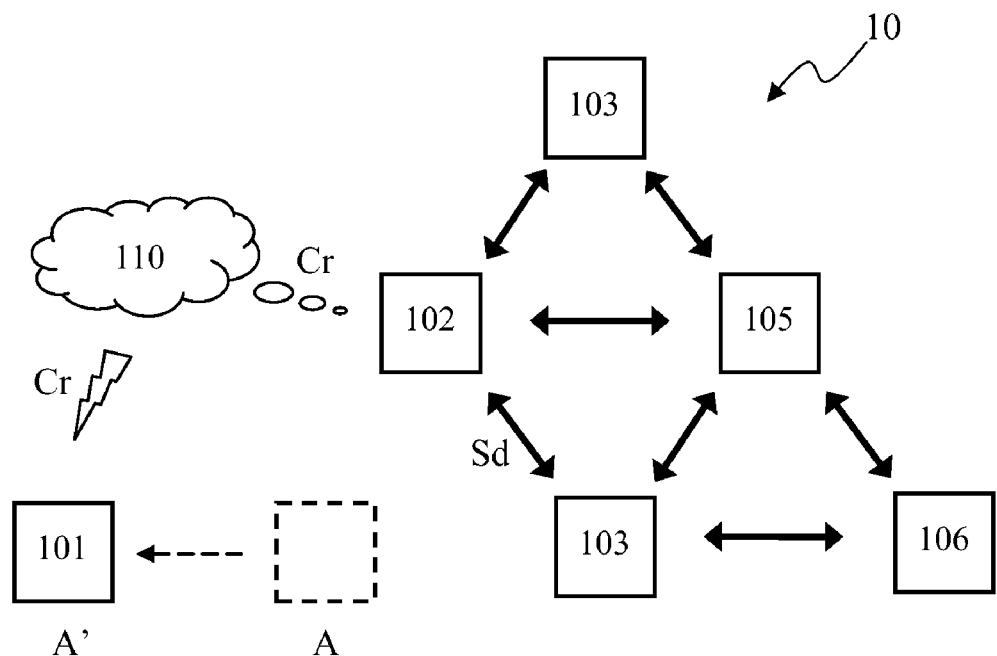

Please refer to FIG. 1A and FIG. 1B, which are explanatory diagrams illustrating the connection-lost network node loses connection with the wireless local network group. The wireless local network group 10 is composed by network nodes 101-106. Each of the network nodes 101-106 has a wireless module equipped therein to connect with each other wirelessly. As shown in the drawing, each of the network nodes 101-106 connects with two or three adjacent network nodes 101-106 respectively. In the initial state, for example, the network node 101 at location A is connected with the network node 102 and the network node 103 respectively. However, when the network node 101 moves to another position A' (or if the network node 101 moves slower than the rest of the network nodes 102-106 (such as the whole wireless local network group 10 is moving)) the network node 101 will not able to maintain the wireless connection with any of the rest of the network nodes 102-106. Therefore the network node 101 loses connection with the wireless local network group 10.

Figure 2:
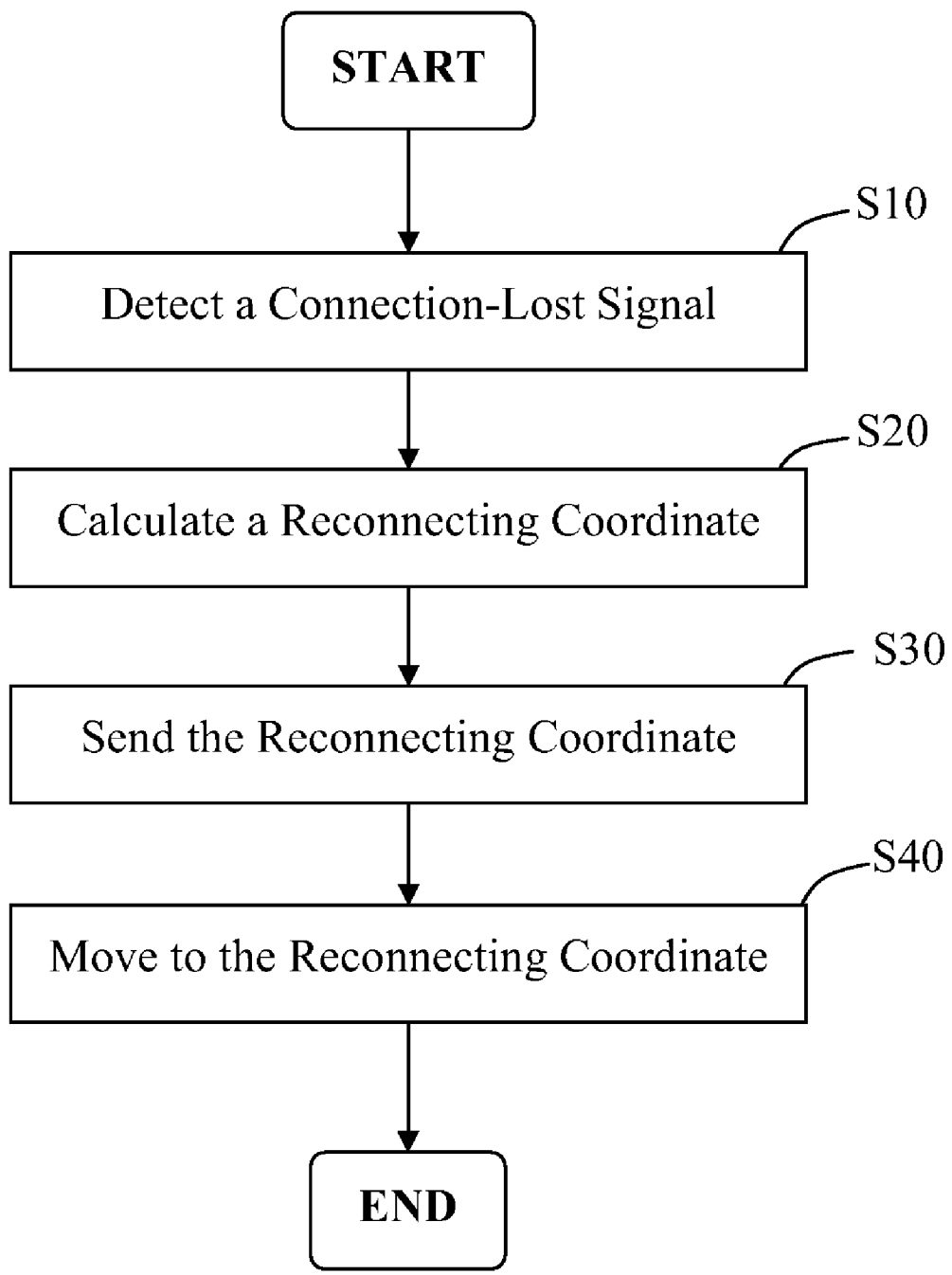
FIG. 2 is a flow chart of the wireless local network reconnecting method according to the present invention.

Please refer to FIG. 2, which is a flow chart of the wireless local network reconnecting method according to the present invention. The method includes the following steps.

Step S10: Detecting the connection-lost signal. The method detects a connection-lost signal generated when the network node 101 loses connection with the wireless local network group 10. For example, when the network node 101 loses connection with the network node 103, the network node 103 may generate and issue the connection-lost signal Sd (i.e. sending to the network node 102).

Step S20: Calculate a reconnecting coordinate. Since the network node 101 can not wirelessly connect with the wireless local network group 10 through the original wireless connections, one of the network nodes 102-106 needs to set a correlation/connection (capable of sending data to each other) with the connection-lost network node 101 through an external communication network 110. For example, the network node 102 may be equipped with an external communication module (not shown) therein, which needs to be actuated to connect with the external communication network 110 before calculate the reconnecting coordinate Cr. The network node 102 may calculate the reconnecting coordinate Cr and connect to the external communication network 110 in parallel or in a preset consequence; the reconnecting coordinate Cr may be selectively defined as any location within a future transmission range of the wireless local network group 10 right now or after a preset duration. The external communication network 110 may be selected from one or more of 3G wireless communication network, GPRS (General Packet Radio Service) wireless network or Satellite Communication Network. Certainly, the network node 101 should have a dedicated external communication module to connect with the external communication network as well.

The external communication network is used within the method to connect/correlate with the connection-lost network node 101 and the reconnecting coordinate Cr is further calculated, thereby allowing the network node 101 to be guided and move to the reconnecting coordinate Cr for reconnecting wirelessly with the wireless local network group 10. Certainly, the connection-lost network node 101 also needs to have an external communication module equipped thereon to connect with the external communication network 110.

Step S30: Send the reconnecting coordinate Cr. Through the external communication network, the reconnecting coordinate Cr may be sent (i.e. by the network node 102) to the connection-lost network node 101.

Step S40: Move to the reconnecting coordinate Cr. The connection-lost network node 101 may be guided by the external communication network or a navigating device embedded on the connection-lost network node 101, the connection-lost network node 101 may move to the reconnecting coordinate Cr; when arrived, the connection-lost network node 101 will be able to reconnect wirelessly with the wireless local network group 10 (such as reconnecting with the network node 102 and or the network node 103).

Beside, after Step S40, the method may further including the steps of detecting a reconnecting signal generated when the network node 101 reconnects wirelessly with the wireless local network group 10, and then disconnecting with the external communication network 110 according to the reconnecting signal. For example, the network node 101 may generate and issue the reconnecting signal. The network node 101 may disconnects with the external communication network 110 after reconnecting with the wireless local network group 10.

Figure 3:
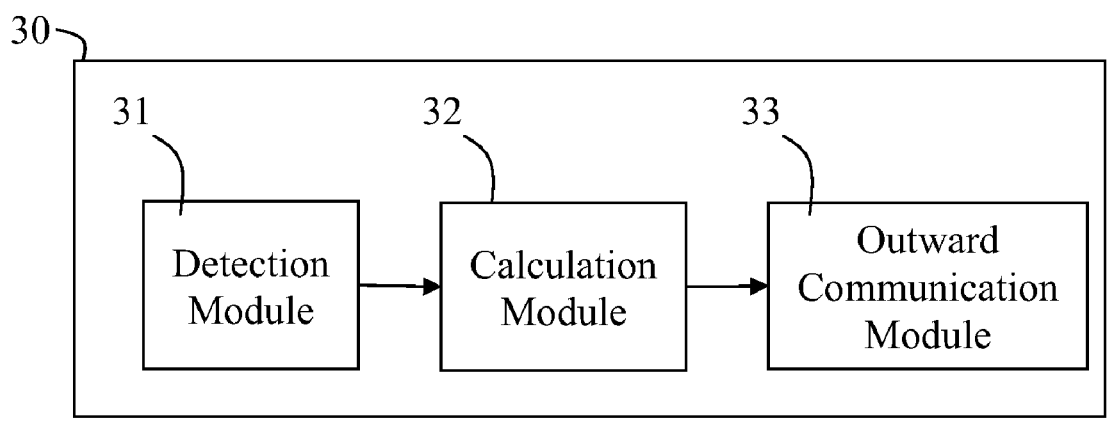
FIG. 3 is a system diagram of the wireless local network reconnecting system according to the present invention.

Please refer to FIG. 3, which is a system diagram of the wireless local network reconnecting system 30 according to the present invention. The wireless local network reconnecting system 30 mainly includes a detection module 31, a calculation module 32 and an external communication module 33. For example, the wireless local network reconnecting system 30 may be implemented on the rest of the network nodes 102-106 (such as the network node 102) in FIG. 1A and FIG. 1B.

The detection module 31 detects a connection-lost signal generated when the network node 101 of the wireless local network group 10 loses connection.

The calculation module 32 calculates the reconnecting coordinate Cr according to the connection-lost signal.

The external communication module 33 connects with the external communication network 110 and allows any of the rest of the network node 102-106 (such as the network node 102, when embedded therein) within the wireless local network group 10 to connect/correlate with the connection-lost network node 101 through the external communication network 110. The reconnecting coordinate Cr will be sent through the network node 101 the external communication network 110, to guide the network node 101 to move the reconnecting coordinate Cr and reconnect wirelessly with the wireless local network group 10.

Furthermore, the detection module 31 detects a reconnecting signal generated when the connection-lost network node 101 connects wirelessly with the wireless local network group 10. Namely, the external communication module 33 may connect with the external communication network 110 (or the external communication module 33 may be actuated) according to the connection-lost signal, and disconnect with the external communication network 110 (or the external communication module 33 may be closed) according to the reconnecting signal. In addition, the external communication module 33 may guide, or the system 30 may further includes a guiding module (such as a location navigating module) to guide the connection-lost network node 101 to move to the reconnecting coordinate Cr and reconnect wirelessly with the wireless local network group 10.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. A wireless local network reconnecting method, adapted to a wireless local network group equipped with a wireless transmission mode, each of a plurality of network nodes within the wireless local network group having a geographic location information of the location of the network node itself, the wireless local network reconnecting method comprising the steps of:

detecting a connection-lost signal generated when the wireless local network group loses connection with a connection-lost one of the network nodes;

connecting with the connection-lost network node through an external communication network;

calculating a reconnecting coordinate;

sending the reconnecting coordinate to the connection-lost network node through the external communication network;

the connection-lost network node moving to the reconnecting coordinate and reconnecting with the wireless local network group wirelessly.

2. The wireless local network reconnecting method as claimed in claim 1 further comprising the step of:

connecting to the external communication network according to the connection-lost signal.

3. The wireless local network reconnecting method as claimed in claim 1 further comprising the step of:

detecting a reconnecting signal generated when the connection-lost network node is wirelessly reconnecting with the wireless local network group.

4. The wireless local network reconnecting method as claimed in claim 3 further comprising the step of:

disconnecting with the external communication network according to the reconnecting signal.

5. The wireless local network reconnecting method as claimed in claim 1, wherein the geographic location information is compatible with a positing system selected from a group consisting of GPS (Global Positing System), AGPS (Assisted Global Positioning System), GPCS (Global Positing & Communication System), DGPS (Differential Global Positing System), CDGPS (Canadian Differential Global Positing System), Galileo Positioning System, GLONASS (Global Navigation Satellite System) and any combination of the foregoing.

6. The wireless local network reconnecting method as claimed in claim 1, wherein the wireless transmission mode of the wireless local network group is compatible with any of Wi-Fi, Bluetooth or Infrared.

7. The wireless local network reconnecting method as claimed in claim 1, wherein the network node is selected from the group consisting of mobile phone, notebook computer, Personal Digital Assistant (PDA), desktop computer and any combination of the foregoing.

8. The wireless local network reconnecting method as claimed in claim 1, wherein the external communication network is 3G wireless network or GPRS (General Packet Radio Service) wireless network.

9. The wireless local network reconnecting method as claimed in claim 1, wherein the external communication network is Satellite Communication Network.

10. A wireless network reconnecting system, adapted to a wireless local network group equipped with a wireless transmission mode, each of a plurality of network nodes within the wireless local network group having a geographic location information of the location of the network node itself, the wireless local network reconnecting system comprising:

a detection module, detecting a connection-lost signal generated when the wireless local network group loses connection with a connection-lost one of the network nodes;

a calculation module, calculating a reconnecting coordinate; and an external communication module, connecting with an external communication network to allow the wireless local network group to correlate with the connection-lost the network node, and sending the reconnecting coordinate to the connection-lost the network node through the external communication network.

11. The wireless local network reconnecting system as claimed in claim 10, wherein the external communication module or a guiding module further guides the connection-lost network node to move to the reconnecting coordinate and wirelessly reconnect with the wireless local network group.

12. The wireless local network reconnecting system as claimed in claim 10, wherein the external communication module is actuated according to the connection-lost signal.

13. The wireless local network reconnecting system as claimed in claim 10, wherein the detection module further detects a reconnecting signal generated when the connection-lost network node is wirelessly reconnecting with the wireless local network group.

14. The wireless local network reconnecting system as claimed in claim 12, wherein the external communication module is closed according to the reconnecting signal.

15. The wireless local network reconnecting system as claimed in claim 10, wherein the geographic location information is compatible with a positing system selected from a group consisting of GPS (Global Positing System), AGPS (Assisted Global Positioning System), GPCS (Global Positing & Communication System), DGPS (Differential Global Positing System), CDGPS (Canadian Differential Global Positing System), Galileo Positioning System, GLONASS (Global Navigation Satellite System) and any combination of the foregoing.

16. The wireless local network reconnecting system as claimed in claim 10, wherein the wireless transmission mode of the wireless local network group is compatible with any of Wi-Fi, Bluetooth or Infrared.

17. The wireless local network reconnecting system as claimed in claim 10, wherein the network node is selected from the group consisting of mobile phone, notebook computer, Personal Digital Assistant (PDA), desktop computer and any combination of the foregoing.

18. The wireless local network reconnecting system as claimed in claim 10, wherein the external communication network is 3G wireless network or GPRS (General Packet Radio Service) wireless network.

19. The wireless local network reconnecting system as claimed in claim 10, wherein the external communication network is Satellite Communication Network.

20. The wireless local network reconnecting system as claimed in claim 10, wherein the wireless local network reconnecting system is implemented in at least one of the rest of network nodes, and the connection-lost network node comprises a dedicated external communication module to connect with the external communication network when losing connection.

* * * * *